(12) United States Patent
Satou et al.

(10) Patent No.: US 8,551,908 B2
(45) Date of Patent: Oct. 8, 2013

(54) EXHAUST GAS PURIFICATION CATALYST

(75) Inventors: Akemi Satou, Toyota (JP); Masahiko Takeuchi, Toyota (JP); Keizo Hiraku, Miyoshi (JP); Yusuke Kawamura, Susono (JP); Takahiro Fujiwara, Susono (JP); Tadashi Suzuki, Seto (JP); Naoki Takahashi, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 292 days.

(21) Appl. No.: 13/001,683

(22) PCT Filed: Jun. 26, 2009

(86) PCT No.: PCT/IB2009/006068
§ 371 (c)(1),
(2), (4) Date: Dec. 28, 2010

(87) PCT Pub. No.: WO2010/001215
PCT Pub. Date: Jan. 7, 2010

(65) Prior Publication Data
US 2011/0099987 A1    May 5, 2011

(30) Foreign Application Priority Data
Jun. 30, 2008  (JP) .................................. 2008-170769

(51) Int. Cl.
*B01J 23/00*  (2006.01)
*B01J 21/00*  (2006.01)

(52) U.S. Cl.
USPC ........... 502/327; 502/262; 502/263; 502/302; 502/303; 502/304; 502/332; 502/333; 502/334; 502/339; 502/349; 502/350; 502/351; 502/355; 502/415; 502/439; 502/527.12; 502/527.13

(58) Field of Classification Search
USPC ......... 502/262, 263, 302–304, 327, 332–334, 502/339, 349–351, 355, 415, 439, 527.12, 502/527.13
See application file for complete search history.

(56) References Cited

U.S. PATENT DOCUMENTS
6,022,825 A * 2/2000 Andersen et al. ............. 502/303
6,150,288 A * 11/2000 Suzuki et al. ................. 501/105
(Continued)

FOREIGN PATENT DOCUMENTS
EP  0 827 775 A1  3/1998
EP  1 190 761 A1  3/2002
(Continued)

OTHER PUBLICATIONS
International Search Report in International Application No. PCT/IB2009/006068; Mailing Date: Dec. 15, 2009.
(Continued)

*Primary Examiner* — Cam N. Nguyen
(74) *Attorney, Agent, or Firm* — Finnegan, Henderson, Farabow, Garrett & Dunner, LLP

(57) ABSTRACT

An exhaust gas purification catalyst includes: a lower catalyst layer that contains a ceria-zirconia mixed oxide having 50 to 70 mass % of $CeO_2$ and 5 mass % or more of $Pr_2O_3$ and carries at least one of Pt and Pd; and an upper catalyst layer that contains at least zirconia and carries at least Rh, wherein the total amount of $CeO_2$ per liter of the carrier base is 15 to 30 g. Because the amount of $CeO_2$ is small, formation of $H_2S$ is suppressed and a high capability of adsorbing and releasing oxygen is brought out in spite of the small amount of $CeO_2$.

12 Claims, 11 Drawing Sheets

(56) References Cited

U.S. PATENT DOCUMENTS

| | | | |
|---|---|---|---|
| 6,294,140 B1 * | 9/2001 | Mussmann et al. | 423/213.5 |
| 6,306,794 B1 * | 10/2001 | Suzuki et al. | 502/304 |
| 6,514,905 B1 * | 2/2003 | Hanaki et al. | 502/328 |
| 7,081,430 B2 * | 7/2006 | Uenishi et al. | 502/327 |
| 7,374,729 B2 * | 5/2008 | Chen et al. | 422/177 |
| 7,517,510 B2 * | 4/2009 | Chen et al. | 423/213.2 |
| 7,517,826 B2 * | 4/2009 | Fujdala et al. | 502/60 |
| 7,547,656 B2 * | 6/2009 | Miura | 502/327 |
| 7,550,124 B2 * | 6/2009 | Chen et al. | 423/213.2 |
| 7,576,031 B2 * | 8/2009 | Beutel et al. | 502/339 |
| 7,674,743 B2 * | 3/2010 | Gandhi et al. | 502/302 |
| 7,749,472 B2 * | 7/2010 | Chen et al. | 423/213.2 |
| 7,906,449 B2 * | 3/2011 | Ando et al. | 502/66 |
| 8,007,750 B2 * | 8/2011 | Chen et al. | 423/239.1 |
| 2003/0021745 A1 * | 1/2003 | Chen | 423/239.1 |

FOREIGN PATENT DOCUMENTS

| | | |
|---|---|---|
| EP | 1 911 517 A1 | 4/2008 |
| JP | 63-236541 | 10/1988 |
| JP | 7-194978 | 8/1995 |
| JP | 8-15554 | 2/1996 |
| JP | 2598817 | 1/1997 |
| JP | 2000-312825 | 11/2000 |
| JP | 2000-515419 | 11/2000 |
| JP | 2002-361089 | 12/2002 |
| JP | 2004-154766 | 6/2004 |
| JP | 2004-298813 | 10/2004 |
| JP | 2007-90254 | 4/2007 |
| JP | 2007-111650 | 5/2007 |
| WO | WO 2007/031627 A1 | 3/2007 |

OTHER PUBLICATIONS

XP-002557986, Database WPI, Week 200474, AN JP 2004-752176.

E. Rohart et al., "Rare Earths Based Oxides as Alternative Materials to Ba in NOx-trap Catalysts," Topics in Catalysis, vols. 42-43, pp. 71-75 (May 2007).

Notification of Reason(s) for Refusal in Japanese Application No. 2008-170769; Drafting Date: Jun. 23, 2010.

Written Opinion of the International Searching Authority in International Application No. PCT/IB2009/006068; Mailing Date: Dec. 15, 2009.

* cited by examiner

AMOUNT OF $La_2O_3$ IN CERIA-ZIRCONIA MIXED OXIDE OF LOWER CATALYST LAYER (MASS %)

AMOUNT OF ALUMINA IN CATALYST (g/L)

TOTAL AMOUNT OF $CeO_2$-$ZrO_2$ (g/L)

EXHAUST GAS PURIFICATION CATALYST

CROSS-REFERENCE TO RELATED APPLICATIONS

This application is a national phase application of International Application No. PCT/IB2009/006068, filed Jun. 26, 2009, and claims the priority of Japanese Application No. 2008-170769, filed Jun. 30, 2008, the contents of both of which are incorporated herein by reference.

BACKGROUND OF THE INVENTION

1. Field of the Invention

The invention relates to an exhaust gas purification catalyst useful as a three-way catalyst, and in particular, to an exhaust gas purification catalyst that significantly reduces discharge of hydrogen sulfide.

2. Description of the Related Art

Three-way catalysts are widely used as catalysts that reduce HC, CO and NOx in exhaust gas from automobiles. Such a three-way catalyst is obtained by having platinum group noble metals, such as Pt and Rh, carried by porous oxide carriers, such as alumina, ceria, zirconia, or ceria-zirconia. The three-way catalyst oxidizes HC and CO for purification, and also reduces NOx. These reactions proceed most efficiently in the atmosphere in which the amount of oxidation components is substantially equivalent to the amount of reduction components. Thus, in an automobile equipped with a three-way catalyst, air-fuel ratio control is performed so that fuel is combusted near the stoichiometric air-fuel ratio (A/F≈14.6±0.2).

With regard to the three-way catalyst, however, there has been a problem that sulfur oxide in exhaust gas is reduced and discharged as $H_2S$ when the atmosphere of exhaust gas swings to the reduction side. For example, alumina is an essential component of the three-way catalyst, while there has been a problem that in an automobile equipped with a three-way catalyst using alumina, $H_2S$ is formed when the catalyst temperature is high, that is, equal to or higher than 350° C. in a rich atmosphere. The mechanism of formation of $H_2S$ can be explained as follows.

$SO_2$ in exhaust gas is oxidized into $SO_3$ or $SO_4$ with the help of the catalyst in a lean atmosphere. $SO_3$ and $SO_4$ are adsorbed by the basic sites of alumina and the $SO_3$ and $SO_4$ adsorbed are gradually concentrated on alumina. Then, in a rich atmosphere, $SO_3$ and $SO_4$ are reduced and $H_2S$ is formed. Because even a little amount of $H_2S$ is smelled by a person and causes discomfort, discharge of $H_2S$ should be suppressed.

In recent years, ceria, ceria-zirconia mixed oxide, or the like is used as a component of the carrier for the purpose of suppressing fluctuations in the air-fuel ratio. Because ceria has the capability of adsorbing and releasing oxygen, that is, ceria adsorbs oxygen in a lean atmosphere and releases oxygen in a rich atmosphere, it is possible to stably keep the exhaust gas atmosphere near the stoichiometric air-fuel ratio. However, because the basicity of ceria is higher than that of alumina, sulfur oxide tends to be adsorbed by ceria rather than alumina and ceria has the opposite effect in terms of the suppression of discharge of $H_2S$. Specifically, the improvement of the capability of adsorbing and releasing oxygen with the use of ceria and the suppression of formation of $H_2S$ are in a mutually exclusive relation.

It is conceivable that oxide of Ni or Cu is additionally used as a component of the three-way catalyst. Oxide of Ni or Cu turns $SO_2$ into $SO_3$ or $SO_4$ in an oxidizing atmosphere and stores sulfur as sulfide, such as $Ni_3S_2$, for example, in a reducing atmosphere, so that it is possible to suppress formation of $H_2S$.

In Japanese Patent Publication No. H08-015554, for example, an exhaust gas purification catalyst is described in which noble metal is carried by a carrier including a mixed oxide of nickel oxide and barium oxide (hereinafter also referred to as nickel-barium mixed oxide), alumina, and ceria. With regard to this carrier, alumina and ceria capture sulfur oxide as sulfate in a lean atmosphere, and nickel-barium mixed oxide captures $H_2S$ in a rich atmosphere. Thus, it is possible to suppress discharge of $H_2S$.

Published Japanese Translation of PCT application No. 2000-515419 (JP-A-2000-515419) and Japanese Patent No. 2598817 describe that formation of $H_2S$ is suppressed with the use of a carrier in which NiO, $Fe_2O_3$, etc. are mixed. Japanese Patent Application Publication No. H07-194978 (JP-A-07-194978) describes that formation of $H_2S$ is suppressed with the use of a carrier in which Ni and Ca are carried.

However, because Ni and Cu are environmental load substances, using these substances in exhaust gas purification catalyst for automobiles is gradually being restricted. When barium or the like is added to the three-way catalyst, there is a possibility that the original purification performance is deteriorated.

Japanese Patent Application Publication No. S63-236541 (JP-A-S63-236541) describes an exhaust gas purification catalyst in which noble metal is carried by a canter that contains oxide of at least one metal that is selected from Ti, Nb, V, Ta and Mn in addition to alumina and ceria, and also describes that it is possible to suppress formation of $H_2S$.

In addition, there are the following published official gazettes as the most relevant related art. Japanese Patent Application Publication No. 2007-090254 (JP-A-2007-090254) discloses an example of double layer coated catalyst in which an upper catalyst layer contains zirconia particles that carry Rh and has no Pt, a lower catalyst layer contains ceria particles that carry Pt, and the entire amount of ceria contained is 49 g/L.

Japanese Patent Application Publication No. 2004-298813 (JP-A-2004-298813) discloses a double layer coated, exhaust gas purification catalyst that has an upper catalyst layer in which Rh is carried by less-thermally-deteriorative ceria-zirconia mixed oxide or porous alumina and that contains 50 to 70 wt % of less-thermally-deteriorative ceria-zirconia mixed oxide in which the weight ratio between ceria and zirconia is approximately 3:7. The same publication describes that a lower catalyst layer has alumina that carries Pt and also has oxygen-storing ceria-zirconia mixed oxide and that the lower catalyst layer contains 50 to 70 wt % of oxygen-storing ceria-zirconia mixed oxide in which the weight ratio between ceria and zirconia is approximately 1:1.

Japanese Patent Application Publication No. 2007-111650 (W-A-2007-111650) discloses an exhaust gas purifying catalytic converter capable of suppressing generation of odor without reduction in the efficiency of purifying exhaust gas. This includes two exhaust gas purifying catalytic converters that are arranged on the upstream side and the downstream side, respectively, and is characterized in that the ratio of the amount of the component that adsorbs oxygen on the downstream side to the amount thereof on the upstream side is within the range between approximately 1 and 0.5. The listed example contents of ceria in the three-way catalyst on the downstream side in an example are 30 g/L and 20 g/L.

The catalyst described in Japanese Patent Application Publication No. 2007-090254 (JP-A-2007-090254) contains a large amount of ceria and contains no stabilizing agent. Thus, although a high capability of storing oxygen is obtained when the catalyst is fresh, it is expected that the amount of $H_2S$ formed is large. In addition, it is expected that grain growth of ceria is significant and the rate of reduction in the capability of storing oxygen after durability tests is significant because neither zirconia nor an additive is contained.

The catalysts disclosed in JP-A-2004-298813 and JP-A-2007-111650 contain no stabilizing agent and no explicit description on the kind and amount is made in these publications. Thus, it is expected that grain growth of mixed oxide including ceria is significant and the rate of reduction in the capability of storing oxygen is significant.

SUMMARY OF THE INVENTION

An object of the invention is to both improve the capability of adsorbing and releasing oxygen with the use of ceria and suppress formation of $H_2S$ without using Ni nor Cu, which are environmental load substances.

An exhaust gas purification catalyst of the invention is a multilayer exhaust gas purification catalyst that includes a carrier base, a lower catalyst layer formed on a surface of the carrier base, and an upper catalyst layer formed on a surface of the lower catalyst layer. The lower catalyst layer includes: a lower layer carrier that contains a ceria-zirconia mixed oxide having 50 to 70 mass % of $CeO_2$ and 5 mass % or more of $Pr_2O_3$; and at least one of Pt and Pd, which is carried by the lower layer carrier. The upper catalyst layer includes: an upper layer carrier that contains oxides including at least zirconia; and at least Rh that is carried by the upper layer carrier, wherein the total amount of $CeO_2$ per liter of the carrier base is 15 to 30 g.

In the exhaust gas purification catalyst of the invention, a large part of ceria-zirconia mixed oxide that is essential to obtain the capability of adsorbing and releasing oxygen is placed in the lower catalyst layer, and the composition ratio and the additive of the ceria-zirconia mixed oxide, and the total amount of coating of $CeO_2$ are optimized, so that it is possible to secure a necessary and sufficient level of capability of adsorbing and releasing oxygen that is required to bring out the performance as a catalyst even after durability tests. In addition, formation of $H_2S$ is suppressed by minimizing the amount of sulfur in exhaust gas that is adsorbed by the catalyst.

The upper layer carrier may contain a zirconia-ceria mixed oxide in which a $ZrO_2$ content is equal to or higher than 50 mass %. The zirconia-ceria mixed oxide may contain 7 to 15 mass % of $Y_2O_3$. The zirconia-ceria mixed oxide may contain 10 to 15 mass % of $Nd_2O_3$. The zirconia-ceria mixed oxide may contain 10 to 30 mass % of $CeO_2$. The zirconia-ceria mixed oxide of the upper catalyst layer may carry 80% or more of entire Rh. The ceria-zirconia mixed oxide may contain 1 mass % or more of $La_2O_3$.

The total amount of alumina that is contained in the exhaust gas purification catalyst may be equal to or less than 100 g per liter of the carrier base. The total amount of ceria and zirconia that are contained in the exhaust gas purification catalyst may be 30 to 50 g per liter of the carrier base.

The total amount of the upper catalyst layer and the lower catalyst layer that are formed may be equal to or less than 150 g per liter of the carrier base. The total surface area of the exhaust gas purification catalyst may be within a range of 6000 to 10000 $m^2/L$. The ceria-zirconia mixed oxide of the lower catalyst layer may carry 80% or more of entire Pt. The lower layer carrier and the upper layer carrier may contain active alumina that contains 2 to 6 mass % of $La_2O_3$. The exhaust gas purification catalyst may contain 15 g or less of $BaSO_4$ per liter of the carrier base.

According to the exhaust gas purification catalyst of the invention, two objects that are difficult to achieve simultaneously, that is, improvement of the capability of adsorbing and releasing oxygen and suppression of formation of $H_2S$, are both achieved.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
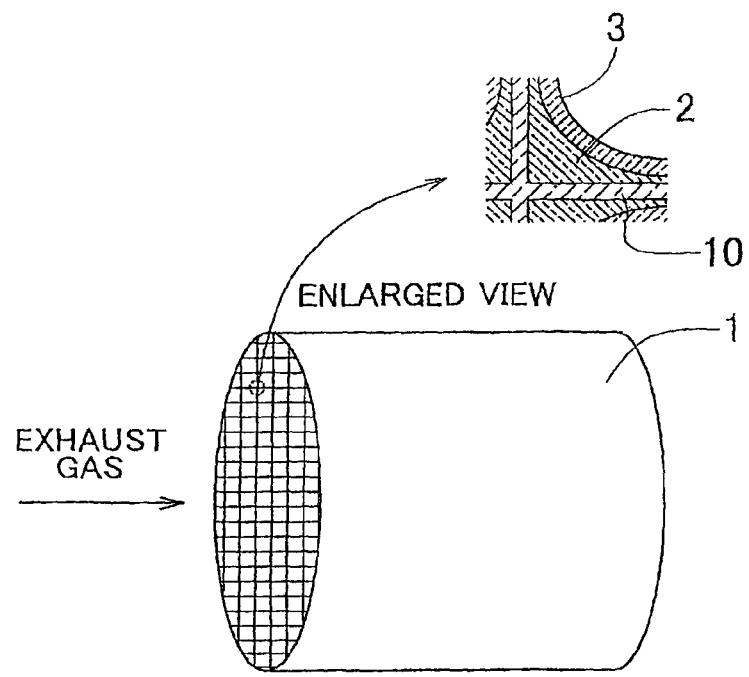
FIG. 1 is an explanatory diagram showing an exhaust gas purification catalyst according to an embodiment of the invention with an enlarged sectional view of an important part.

An exhaust gas-purifying catalyst of the invention includes a carrier base, a lower catalyst layer, and an upper catalyst layer. As the carrier base, one that has a honeycomb shape, a foam shape, or a pellet shape can be used. The material is not particularly limited and a well-known one, such as made of ceramics, such as cordierite or SiC, or made of metal.

The lower catalyst layer is formed on the surface of the carrier base. The lower catalyst layer includes a lower layer carrier and at least one of Pt and Pd that is carried by the lower layer carrier. The lower layer carrier contains a ceria-zirconia mixed oxide that contains 50 to 70 percent by mass (hereinafter abbreviated as "mass %") of $CeO_2$ and 5 mass % or more of $Pr_2O_3$. Another porous oxide, such as alumina or titania, may be mixed. A ceria-zirconia-alumina mixed oxide may also be used, for example.

It is preferable that the ceria-zirconia mixed oxide in the lower layer carrier contain 50 to 70 mass % of ceria. When the ceria content is less than 50 mass %, the capability of adsorbing and releasing oxygen lacks and the purification activity as a three-way catalyst declines. In addition, the amount of $H_2S$ discharged increases when the ceria content exceeds 70 mass %.

When the lower layer carrier is made up of ceria-zirconia mixed oxide only, the strength of adhesion to the carrier base is low and there is a possibility that the lower layer carrier comes off during use. For the purpose of avoiding this problem, it is preferable that alumina be mixed into the lower layer carrier. However, the amount of alumina mixed in the lower layer carrier should be restricted within the range of 30 to 70 g per litter of the carrier base.

The ceria-zirconia mixed oxide in the lower layer carrier contains 5 mass % or more of $Pr_2O_3$. When the $Pr_2O_3$ content is less than 5 mass %, the capability of adsorbing and releasing oxygen declines. However, even when the $Pr_2O_3$ content exceeds 10 mass %, the effect is saturated and there is a possibility that the relative amount of $CeO_2$ lacks and the capability of adsorbing and releasing oxygen therefore declines.

It is preferable that the ceria-zirconia mixed oxide in the lower layer carrier further contain La oxide. When the ceria-zirconia mixed oxide contains La oxide, the specific surface area increases and the purification activity is improved. It is preferable that the ceria-zirconia mixed oxide contain $La_2O_3$ within the range of 1 to 5 mass %. When the $La_2O_3$ content is less than 1 mass %, the thermal resistance of the lower layer carrier can be insufficient. When the $La_2O_3$ content exceeds 5 mass %, the effect is saturated and there is a possibility that the relative amount of $CeO_2$ lacks and the capability of adsorbing and releasing oxygen declines.

The lower layer carrier carries at least one of Pt and Pd. It is preferable that 80% or more of the entire Pt and Pd in the catalyst be carried by the lower layer carrier. It is preferable that Pt be carried by the ceria-zirconia mixed oxide only. It has been found that ceria or ceria-zirconia mixed oxide has a characteristic that the greater the amount of Pt carried is, the less the number of basic sites is. Thus, when Pt is carried by ceria-zirconia mixed oxide only, sulfur oxide is less prone to be adsorbed and it is possible to further suppress the discharge of $H_2S$. In addition, the capability of adsorbing and releasing ceria is improved.

It is preferable that the amount of at least one of Pt and Pd carried, that is, the total amount of at least one of Pt and Pd in the lower catalyst layer and the upper catalyst layer, fall within the range of 0.05 to 3 g per liter of the carrier base. When the amount of at least one of Pt and Pd carried is below this range, the purification activity as a three-way catalyst declines and, even when the amount of at least one of Pt and Pd carried exceeds this range, the effect is saturated. Note that another catalytic metal, such as Rh, may be carried by the lower layer carrier within the range in which the activity of at least one of Pt and Pd does not decline.

For the purpose of forming the lower catalyst layer, a slurry that contains lower layer carrier powder may be wash-coated on a carrier base and at least one of Pt and Pd may be carried by the resultant carrier base. Alternatively, a slurry that contains catalyst powder obtained by making ceria-zirconia mixed oxide powder carry at least one of Pt and Pd in advance may be wash-coated on a carrier base. The amount of coating of the lower catalyst layer may be 50 to 150 g per liter of the carrier base. When the amount of coating is below this range, there is a possibility that grain growth of Pt occurs during use, which can cause deterioration. When the amount of coating exceeds this range, the exhaust gas pressure loss increases.

The upper catalyst layer is formed on the surface of the lower catalyst layer. The upper catalyst layer includes an upper layer carrier and at least Rh that is carried by the upper layer carrier. The upper layer carrier is made of oxide that contains at least zirconia. The upper layer carrier may be made of zirconia only. Instead, another porous oxide, such as ceria, alumina, or titania, may be mixed. Alternatively, zirconia-ceria mixed oxide, zirconia-ceria-alumina mixed oxide, etc. may be used.

It is preferable that the upper layer carrier contain 50 mass % or more of zirconia. When the zirconia content is less than 50 mass %, grain growth of Rh that is carried occurs and the activity declines, which is not preferable. When a mixed oxide is used; it is preferable that zirconia-rich zirconia-ceria mixed oxide be used, in which the concentration of zirconia is higher than the concentration of ceria. In this case, it is preferable that the amount of $CeO_2$ in zirconia-ceria mixed oxide be within the range of 10 to 30 mass %. When the amount of $CeO_2$ is less than 10 mass %, the effect of moderating fluctuations of the atmosphere declines and, when the amount of $CeO_2$ exceeds 30 mass %, adsorption of SOx is facilitated, so that the amount of $H_2S$ discharged increases.

When the upper layer carrier is made up of zirconia or zirconia-ceria mixed oxide only, the strength of adhesion to the lower catalyst layer is low and there is a possibility that the lower layer carrier comes off during use. For the purpose of avoiding this problem, it is preferable that alumina be mixed into the lower layer carrier. However, the amount of alumina mixed in the upper layer carrier should be restricted within the range of 10 to 40 g per litter of the carrier base.

It is preferable that the upper layer carrier further contain at least one of neodymium oxide and yttrium oxide. When the upper layer carrier contains such an oxide(s), the grain growth of Rh is restricted and the capability of adsorbing and releasing oxygen is improved. It is preferable that at least one of neodymium oxide and yttrium oxide be contained, within the range of 7 to 30 mass %, in zirconia or zirconia-ceria mixed oxide. When the zirconia-ceria mixed oxide is used, it is preferable that $Nd_2O_3$ be contained, within the range of 10 to 15 mass %, in the zirconia-ceria mixed oxide. When the $Nd_2O_3$ content is less than 10 mass %, grain growth of Rh is facilitated and the durability of the purification activity declines. When the $Nd_2O_3$ content exceeds 15 mass %, the relative amount of $CeO_2$ lacks and the capability of adsorbing and releasing oxygen therefore declines.

It is preferable that $Y_2O_3$ be contained, within the range of 7 to 15 mass %, in zirconia or zirconia-ceria mixed oxide. When the $Y_2O_3$ content is less than 7 mass %, grain growth of Rh is facilitated. When the $Y_2O_3$ content exceeds 15 mass %, the specific surface area of the upper layer carrier declines.

The upper layer carrier carries at least Rh. It is preferable that 80% or more of the entire Rh in the catalyst be carried by the upper layer carrier. It is preferable that Rh be carried by zirconia or zirconia-ceria mixed oxide only. With this composition, solid solution of Rh into the carrier is prevented and it is possible to suppress the degradation of Rh. In addition, the reduction activity of Rh is maximally manifested and the performance of reducing NOx is improved.

The amount of Rh carried, which is the total amount of Rh contained in the lower catalyst layer and the upper catalyst layer, is preferably within the range of 0.02 to 0.5 per liter of the carrier base. When the amount of Rh carried is below this range, the purification activity as a three-way catalyst declines. When the amount of Rh carried exceeds this range, the effect is saturated. Another catalytic metal, such as Pt or Pd, may be carried by the upper layer carrier within the range in which the activity of Rh is not reduced.

For the purpose of forming the upper catalyst layer, a slurry that contains upper layer carrier powder may be wash-coated on a carrier base that has the lower catalyst layer and at least Rh may be carried by the resultant carrier base. Alternatively, a slurry that contains catalyst powder obtained by making zirconia powder or zirconia-ceria mixed oxide powder carry Rh in advance may be wash-coated on a carrier base that has the lower catalyst layer. The amount of coating of the upper catalyst layer may be 30 to 50 g per liter of the carrier base. When the amount of coating is below this range, there is a possibility that grain growth of Rh occurs during use, which can cause deterioration. When the amount of coating exceeds this range, the exhaust gas pressure loss increases.

The $CeO_2$ content in the lower and upper catalyst layers is within the range of 10 to 30 g, preferably within the range of 15 to 30 g, per liter of the carrier base. When the $CeO_2$ content is less than 10 g/L, the capability of adsorbing and releasing oxygen can be insufficient. When the $CeO_2$ content exceeds 30 g/L, the amount of SOx adsorbed increases, which increases the amount of $H_2S$ formed. When the $CeO_2$ content is within the range of 10 to 30 g/L, or preferably within the range of 15 to 30 g/L, achieving both the effect of moderating fluctuations of the atmosphere due to the capability of adsorbing and releasing oxygen and the effect of suppressing formation of $H_2S$ is facilitated.

The invention will be specifically described below with the use of examples, comparative examples, and experiment examples.

Example 1

FIG. 1 schematically shows an exhaust gas purification catalyst of Example 1. The exhaust gas purification catalyst includes a honeycomb base 1, a lower catalyst layer 2 coated on the surface of cell separation walls 10 of the honeycomb base 1, and an upper catalyst layer 3 coated on the surface of the lower catalyst layer 2.

Hereinafter, a method of manufacturing the exhaust gas purification catalyst will be described, which serves as the detailed description of the construction.

First, ceria-zirconia mixed oxide powder was prepared, which contained 60 mass % of $CeO_2$, 7 mass % of $Pr_2O_3$, and 3 mass % of $La_2O_3$ and of which the specific surface area was approximately 50 $m^2/g$. After a predetermined amount of dinitro-diammine platinum solution was impregnated into the ceria-zirconia mixed oxide powder, the powder was subjected to evaporation to dryness, whereby $Pt/CeO_2$—$ZrO_2$ powder that carried 3.3 mass % of Pt was prepared.

A slurry for the lower layer was prepared by mixing distilled water with 30 parts by mass of $Pt/CeO_2$—$ZrO_2$ powder, 57 parts by mass of γ-alumina powder, 10 parts by mass of $BaSO_4$ powder, and 3 parts by mass of alumina sol ($Al_2O_3$: 10 mass %) as a binder. The honeycomb base 1 (diameter: 103 mm, length: 105 mm), made of cordierite, was immersed in the resultant slurry. After the honeycomb base 1 was taken out and excessive slurry was blown off, the honeycomb base 1 was dried and burned to form the lower catalyst layer 2. In this example, 100 g of the lower catalyst layer 2 was formed per liter of the honeycomb base 1 and 1 g of Pt was carried per liter of the honeycomb base 1.

Next, zirconia-rich zirconia-ceria mixed oxide powder, containing 12 mass % of $Nd_2O_3$, 9 mass % of $Y_2O_3$, and 20 mass % of $CeO_2$, was prepared. After a predetermined amount of rhodium nitrate aqueous solution was impregnated into the zirconia-ceria mixed oxide powder, the powder was subjected to evaporation to dryness, whereby $Rh/ZrO_2$—$CeO_2$ powder that carried 3 mass % of Rh was prepared.

A slurry for the upper layer was prepared by mixing distilled water with 10 parts by mass of $Rh/ZrO_2$—$CeO_2$ powder, 25 parts by mass of γ-alumina powder, and 5 parts by mass of alumina sol ($Al_2O_3$: 10 mass %) as a binder. The honeycomb base 1 on which the above-described lower catalyst layer 2 was formed was immersed in the resultant slurry. After the honeycomb base 1 was taken out and excessive slurry was blown off, the honeycomb base 1 was dried and burned to form the upper catalyst layer 3. In this example, 40 g of the upper catalyst layer 3 was formed per liter of the honeycomb base 1 and 0.3 g of Rh was carried per liter of the honeycomb base 1.

In the obtained catalyst, the total amount of $CeO_2$ contained was 19.3 g per liter of the honeycomb base 1.

Comparative Example 1

A slurry was prepared by mixing distilled water with 30 parts by mass of $Pt/CeO_2$—$ZrO_2$ powder obtained in Example 1, 82 parts by mass of γ-alumina powder, 8 parts by mass of alumina sol ($Al_2O_3$: 10 mass %) as a binder. The honeycomb base 1 similar to that used in Example 1 was immersed in the resultant slurry. After the honeycomb base 1 was taken out and excessive slurry was blown off, the honeycomb base 1 was dried and burned to form a coat layer. In this example, 140 g of the coat layer was formed per liter of the honeycomb base 1.

Then, a predetermined amount of dinitro-diammine platinum solution with a predetermined concentration was impregnated into the coat layer, and the honeycomb base 1 was subjected to evaporation to dryness for carrying Pt. Subsequently, rhodium nitrate aqueous solution with a predetermined concentration was impregnated into the coat layer, and the honeycomb base 1 was subjected to evaporation to dryness for carrying Rh. In this example, 1.0 g of Pt was carried per liter of the honeycomb base 1 and 0.3 g of Rh was carried per liter of the honeycomb base 1.

Experiment Example 1

The catalysts of Example 1 and Comparative Example 1 were installed in an exhaust system of a V-type 8-cylinder 4.3 L engine. With the use of the gasoline that contained sulfur, a 50-hour durability test was conducted under the conditions that the inflow gas temperature was 850° C. and the air-fuel ratio (hereinafter abbreviated as "A/F") was oscillated between A/F=15 and A/F=14 at 1 Hz.

Each of the catalysts after the durability tests was installed in an exhaust system of an in-line 4-cylinder 2.4 L engine. The engine was operated at the stoichiometric air-fuel ratio until the temperature of the gas that flowed into the catalyst became 500° C. and the amount of NOx discharged during this operation was measured. The result is shown in FIG. 2.

Figure 2:
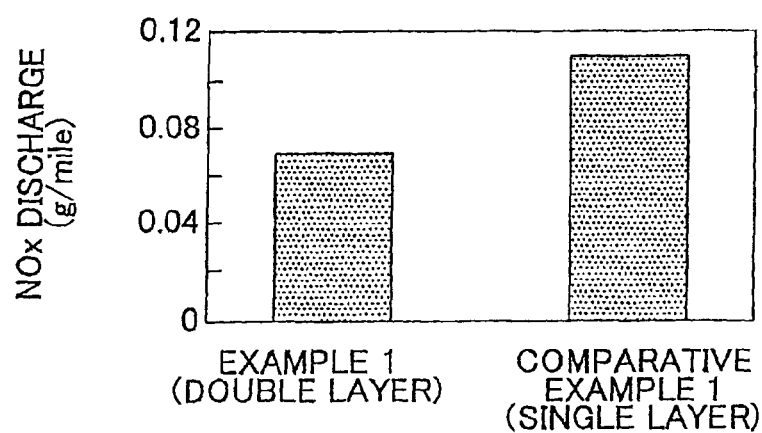
FIG. 2 is a bar graph showing the amount of NOx discharged.

It can be seen from FIG. 2 that the amount of NOx discharged in the case of the catalyst of Example 1 is less than that in the case of the catalyst of Comparative Example 1. It is conceivable that in the case of the catalyst of Example 1, because Pt and Rh were separately carried by the lower catalyst layer 2 and the upper catalyst layer 3, respectively, Pt and Rh were prevented from being combined into an alloy and therefore the catalyst exhibited high performance in reducing NOx.

Each of the catalysts after the durability tests was installed in an exhaust system of an in-line 4-cylinder 2.4 L engine. The engine was operated at the stoichiometric air-fuel ratio until the temperature of the gas that flowed into the catalyst became 500° C. Thereafter, A/F was changed at inversion timings of the sub $O_2$ sensor in such a manner that A/F was caused to oscillate between 14.1 and 15.1 for several cycles. Then, the amount of $O_2$ that flowed into the catalyst was computed based on the following equation and the amount of $O_2$ occluded (oxygen occlusion amount) was measured based on the difference between the amount of inflow $O_2$ and the amount of $O_2$ discharged from the catalyst.

Figure 3:
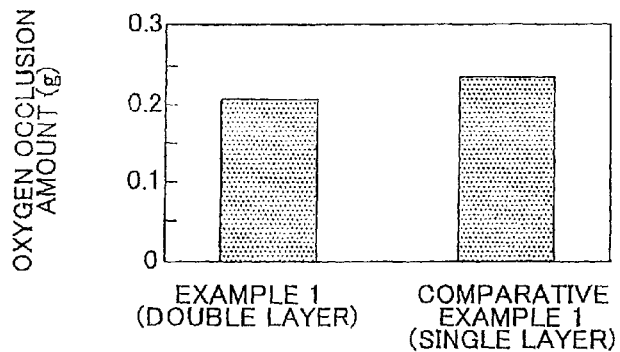
FIG. 3 is a bar graph showing the amount of oxygen occluded.

Amount of $O_2$ that flows into catalyst=Mass proportion of $O_2 \times \Delta A/F \times$Fuel injection amount It can be seen from FIG. 3 that the catalyst of Example 1 has the capability of adsorbing and releasing oxygen almost the same as the capability in the case of Comparative Example 1 and the amount of $CeO_2$ being 19.3 g/L has almost no influence on the capability of adsorbing and releasing oxygen.

Each of the catalysts after the durability tests was installed in an exhaust system of an in-line 4-cylinder 2.4 L engine. The engine was operated at the stoichiometric air-fuel ratio until the temperature of the gas that flowed into the catalyst became 500° C. Thereafter, the air-fuel ratio was changed at inversion timings of the sub $O_2$ sensor in such a manner that A/F was caused to oscillate between 14.1 and 15.1 for several cycles. During this, the amount of $H_2S$ discharged (hereinafter also referred to as "$H_2S$ discharge") was continuously measured. The maximum amount of $H_2S$ discharged (hereinafter also referred to as "$H_2S$ maximum discharge") is shown in FIG. 4.

Figure 4:
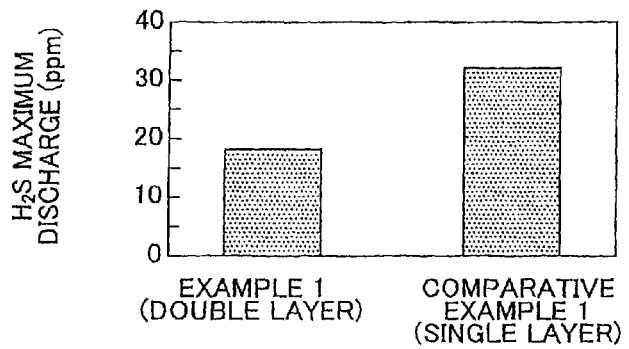
FIG. 4 is a bar graph showing the maximum amount of $H_2S$ discharged.

It is clear from FIG. 4 that the formation of $H_2S$ is suppressed, because the $H_2S$ discharge in the case of the catalyst of Example 1 is less than that in the case of the catalyst of Comparative Example 1.

Experiment Example 2

The lower catalyst layer 2 was formed on the surface of the honeycomb base 1 in a way similar to that of Example 1, except that ceria-zirconia mixed oxide powders, in which the $CeO_2$ content was 40, 50, 60, 70, and 80 mass %, respectively, were used as the ceria-zirconia mixed oxide powder. The honeycomb base 1 and the upper catalyst layer 3 were the same as those of Example 1. Thus, one in which the $CeO_2$ content was 60 mass % was the same as the catalyst of Example 1.

Figure 5:
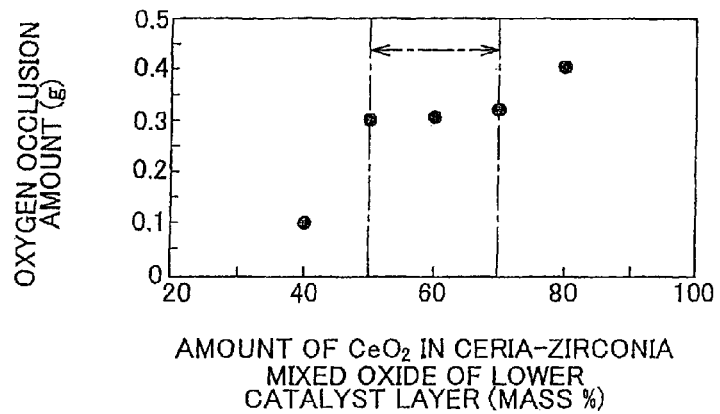
FIG. 5 is a graph showing the relation between the amount of $CeO_2$ in ceria-zirconia mixed oxide of a lower catalyst layer and the amount of oxygen occluded.

Durability tests similar to those of Experiment Example 1 were conducted for the obtained catalysts and the amount of oxygen occluded (oxygen occlusion amount) was measured in a way similar to that of Experiment Example 1 for each of the catalysts after the durability tests. The result is shown in FIG. 5. In addition, the BET specific surface area was measured for each of the catalysts after the durability tests and the result is shown in FIG. 6.

Figure 6:
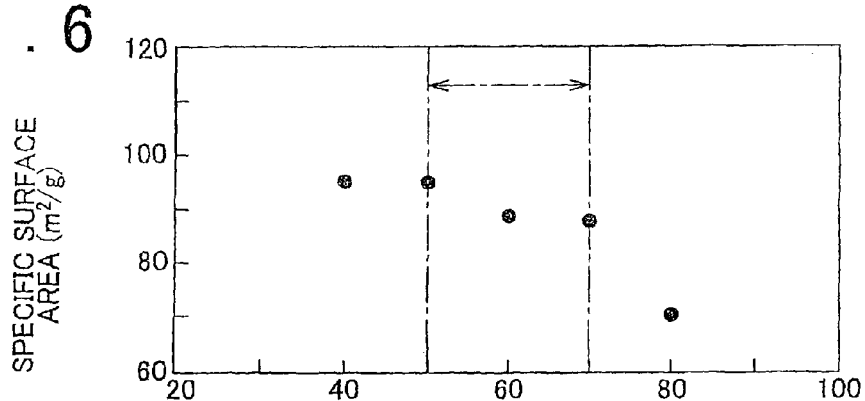
FIG. 6 is a graph showing the relation between the amount of $CeO_2$ in the ceria-zirconia mixed oxide of the lower catalyst layer and the specific surface area.

It can be seen from FIGS. 5 and 6 that, although the capability of adsorbing and releasing oxygen is improved as the $CeO_2$ content increases, the specific surface area decreases. Thus, in view of the trade-off therebetween, it is preferable that the ceria-zirconia mixed oxide contained in the lower catalyst layer 2 contain $CeO_2$ within the range of 50 to 70 mass %.

Experiment Example 3

The lower catalyst layer 2 was formed in a way similar to that of Example 1, except that a slurry for the lower catalyst layer was used in which a ceria-zirconia mixed oxide power was used in which the amount of addition of $Pr_2O_3$ was changed. The honeycomb base 1 and the upper catalyst layer 3 were the same as those of Example 1. With regard to the amount of addition of $Pr_2O_3$ to the ceria-zirconia mixed oxide, seven levels of 0 mass %, 3 mass %, 5 mass %, 6 mass %, 8 mass %, 10 mass %, and 12 mass % were set.

Durability tests similar to those of Experiment Example 1 were conducted for the obtained catalysts and the oxygen occlusion amount was measured in a way similar to that of Experiment Example 1 for each of the catalysts after the durability tests. The result is shown in FIG. 7.

Figure 7:
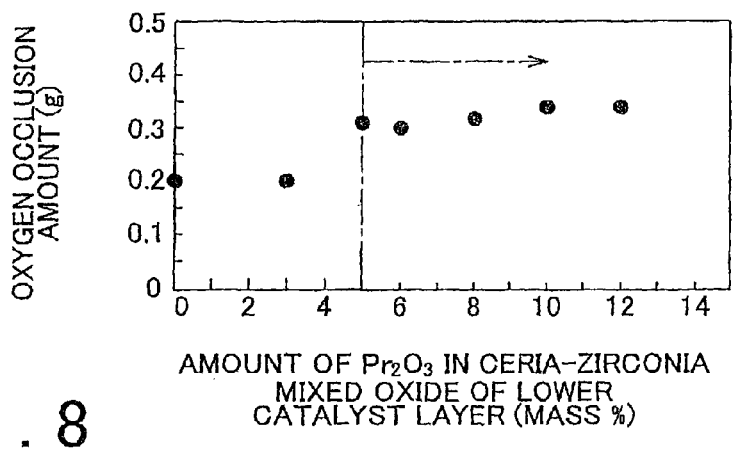
FIG. 7 is a graph showing the relation between the amount of $Pr_2O_3$ in the ceria-zirconia mixed oxide of the lower catalyst layer and the amount of oxygen occluded.

It is clear from FIG. 7 that the capability of adsorbing and releasing oxygen is improved when the ceria-zirconia mixed oxide of the lower catalyst layer 2 contains 5 mass % or more of $Pr_2O_3$. However, because an excessive $Pr_2O_3$ content results in increase in costs, it is preferable that the $Pr_2O_3$ content in the ceria-zirconia mixed oxide is equal to or below 11 mass %.

Experiment Example 4

Figure 8:
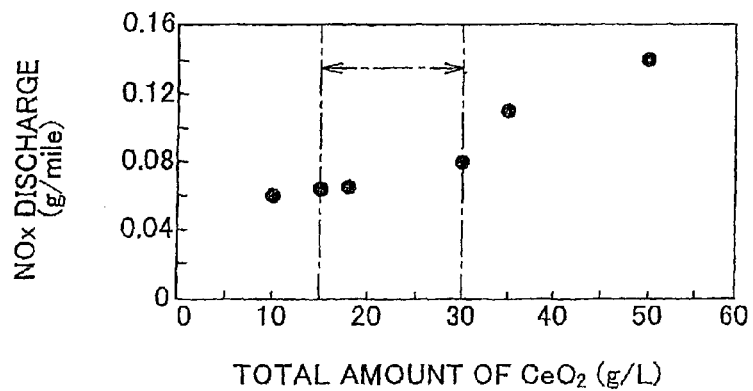
FIG. 8 is a graph showing the relation between the total amount of $CeO_2$ and the amount of NOx discharged.
Figure 9:
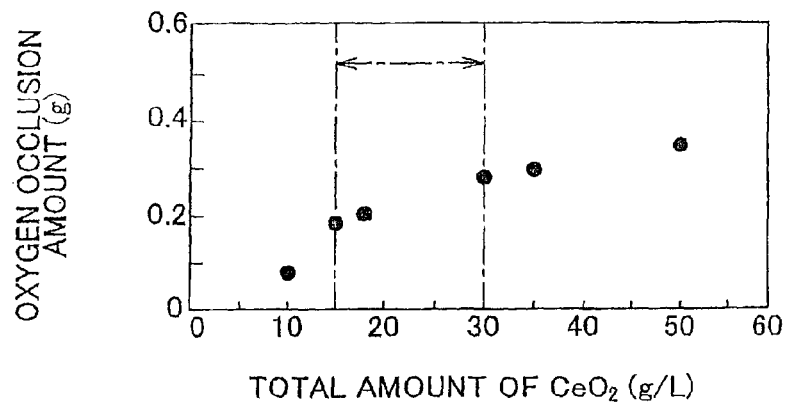
FIG. 9 is a graph showing the relation between the total amount of $CeO_2$ and the amount of oxygen occluded.
Figure 10:
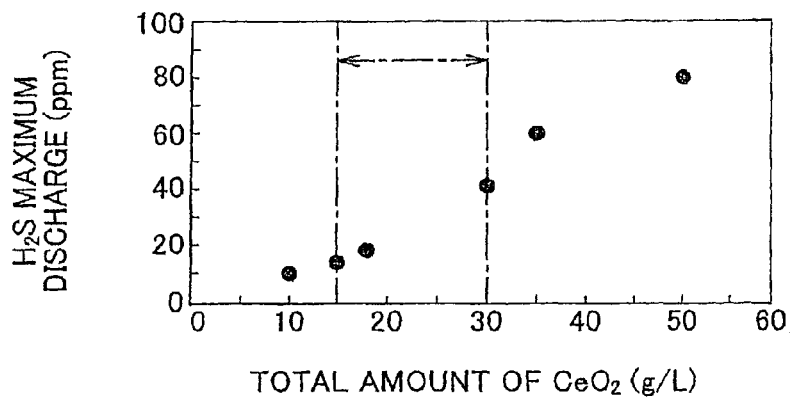
FIG. 10 is a graph showing the relation between the total amount of $CeO_2$ and the maximum amount of $H_2S$ discharged.

After the durability tests similar to those of Experiment Example 1 were conducted using the catalysts prepared in Experiment Example 2 described above, the amount of NOx discharged, the oxygen occlusion amount, and the $H_2S$ maximum discharge were measured in a way similar to that of Experiment Example 1. The results are shown in FIGS. 8 to 10, where the abscissa axis indicates the amount of $CeO_2$ contained per liter of the honeycomb base 1.

It can be understood from FIGS. 8 to 10 that when the amount of $CeO_2$ contained per liter of the honeycomb base 1 falls within the range of 10 to 30 g, the amount of NOx discharged is low and the $H_2S$ maximum discharge becomes equal to or below 50 ppm, so that it is possible to reduce odor. In view of the oxygen occlusion amount, it is preferable that the amount of $CeO_2$ fall within the range of 15 to 30 g.

Experiment Example 5

Five varieties of ceria-zirconia mixed oxide powders were prepared that contained $CeO_2$ at five levels of 40, 50, 60, 70, and 80 mass % $O_2$, respectively, and also contained 3 mass % of $La_2O_3$ and 7 mass % of $Pr_2O_5$. Then, $Pt/CeO_2$—$ZrO_2$ powders that carried 3 mass % of Pt were prepared in a way similar to that of Example 1.

Slurries for the lower layer were prepared by mixing distilled water with 30 parts by mass of $Pt/CeO_2$—$ZrO_2$ powder and 3 parts by mass of alumina sol ($Al_2O_3$: 10 mass %) as a binder. Then, the lower catalyst layer 2 was formed on honeycomb base 1 similar to the honeycomb base of Example 1.

After a predetermined amount of rhodium nitrate aqueous solution was impregnated into zirconia-ceria mixed oxide powder that contained 20 mass % of $CeO_2$, 12 mass % of $Nd_2O_3$, and 9 mass % of $Y_2O_3$, and in which the remaining parts were $ZrO_2$, the zirconia-ceria mixed oxide powder was subjected to evaporation to dryness, whereby $Rh/ZrO_2$—$CeO_2$ powder that carried 0.3 mass % of Rh was prepared.

A slurry for the upper layer was prepared by mixing distilled water with 10 Parts by mass of $Rh/ZrO_2$—$CeO_2$ powder and 5 parts by mass of alumina sol ($Al_2O_3$: 10 mass %) as a binder. Then, in a way similar to that of Example 1, the upper catalyst layer 3 was formed on the lower catalyst layer 2.

Durability tests similar to those of Experiment Example 1 were conducted for the obtained catalysts and the $H_2S$ discharge was measured for each of the catalysts after the durability tests in a way similar to that of Experiment Example 1. The result is shown in FIG. 11.

Figure 11:
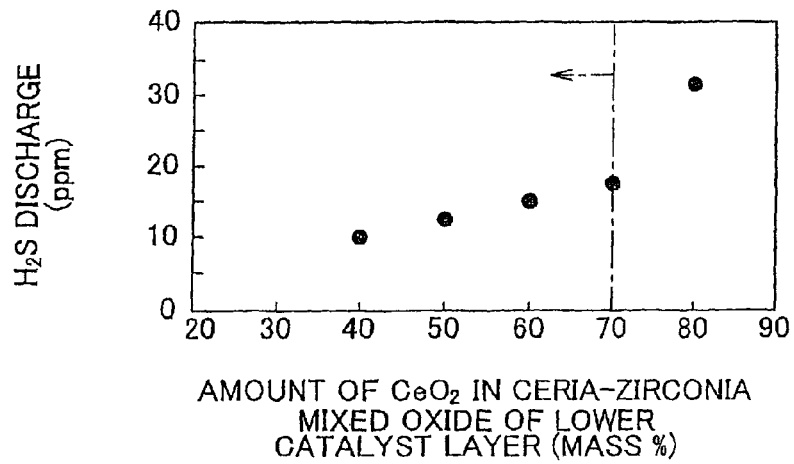
FIG. 11 is a graph showing the relation between the amount of $CeO_2$ in the ceria-zirconia mixed oxide of the lower catalyst layer and the amount of $H_2S$ discharged.

It can be seen from FIG. 11 that the $H_2S$ discharge increases as the $CeO_2$ content in the ceria-zirconia mixed oxide of the lower catalyst layer 2 increases. The upper limit of the $CeO_2$ content is 70 mass % above which the $H_2S$ discharge sharply increases. When the amount of $CeO_2$ is less than 50 mass %, as shown in FIG. 5, the capability of adsorbing and releasing oxygen declines and the effect of moderating fluctuations of the atmosphere thus declines, which results in degradation of purification activity. It is preferable that the amount of $CeO_2$ in the ceria-zirconia mixed oxide, which is a component of the lower catalyst layer 2, be set within the range of 50 to 70 mass %.

Experiment Example 6

The $Pt/CeO_2$—$ZrO_2$ powders were prepared in a way similar to that of Example 1, except that six varieties of ceria-zirconia mixed oxide powders were used that contained $Pr_2O_3$ at six levels of 3, 5, 7, 8, 10, and 12.5 mass %, respectively, and also contained 65 mass % of $CeO_2$ and 3 mass % of $La_2O_3$ and in which the remaining parts were $ZrO_2$. After the lower catalyst layer 2 was formed on the surface of the honeycomb base 1 with the use of each of these $Pt/CeO_2$—$ZrO_2$ powders, the upper catalyst layer 3 was formed in a way similar to that of Example 1.

Durability tests similar to those of Experiment Example 1 were conducted for the obtained catalysts and the oxygen occlusion amount was measured in a way similar to that of Experiment Example 1 for each of the catalysts after the durability tests. The result is shown in FIG. 12.

Figure 12:
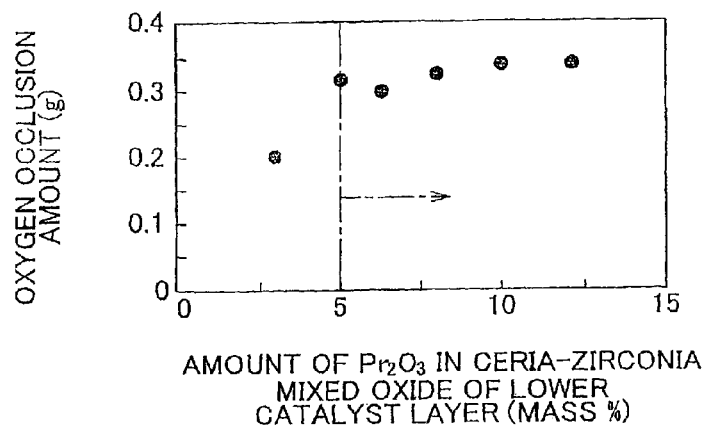
FIG. 12 is a graph showing the relation between the amount of $Pr_2O_3$ in the ceria-zirconia mixed oxide of the lower catalyst layer and the amount of oxygen occluded.

It can be seen from FIG. 12 that the oxygen occlusion amount increases as the $Pr_2O_3$ content in the lower catalyst layer 2 increases and that the oxygen occlusion amount is almost saturated at or above the point at which the $Pr_2O_3$ content is 10 mass %. In addition, it can be seen that below the point at which the $Pr_2O_3$ content is 5 mass %, the oxygen occlusion amount sharply drops. Thus, it is preferable that the amount of $Pr_2O_3$ in the ceria-zirconia mixed oxide, which is a component of the lower catalyst layer 2, be set within the range of 5 to 10 mass %.

Experiment Example 7

The upper catalyst layer 3 was formed on the surface of the lower catalyst layer 2 in a way similar to that of Example 1, except that the zirconia-ceria mixed oxide powders, in which the $ZrO_2$ content was 25 mass %, 37.5 mass %, 50 mass %, 75 mass %, and 87.5 mass %, respectively, were used as the zirconia-ceria mixed oxide powder. The honeycomb base 1 and the lower catalyst layer 2 were the same as those of Example 1. Thus, one in which the $ZrO_2$ content was 75 mass % was the same as the catalyst of Example 1.

Each of the obtained catalysts was set in an evaluation unit and rich/lean durability tests were conducted in which the catalyst was kept at 1000° C. for 5 hours while model gases shown in Table 1 were passed through the catalyst in such a manner that a one-minute supply of the rich gas and a four-minute supply of the lean gas were alternately conducted.

TABLE 1

| | CO (%) | $H_2$ (%) | $CO_2$ (%) | NO (%) | $CH_4$ (%) | $H_2O$ (%) | $O_2$ (%) | $N_2$ |
|---|---|---|---|---|---|---|---|---|
| Rich | 1.125 | 0.375 | 3 | 0.025 | 0.007 | 3 | — | REMAINING PARTS |
| Lean | 1.125 | 0.375 | 3 | 0.025 | 0.007 | 3 | 4 | REMAINING PARTS |

Figure 13:
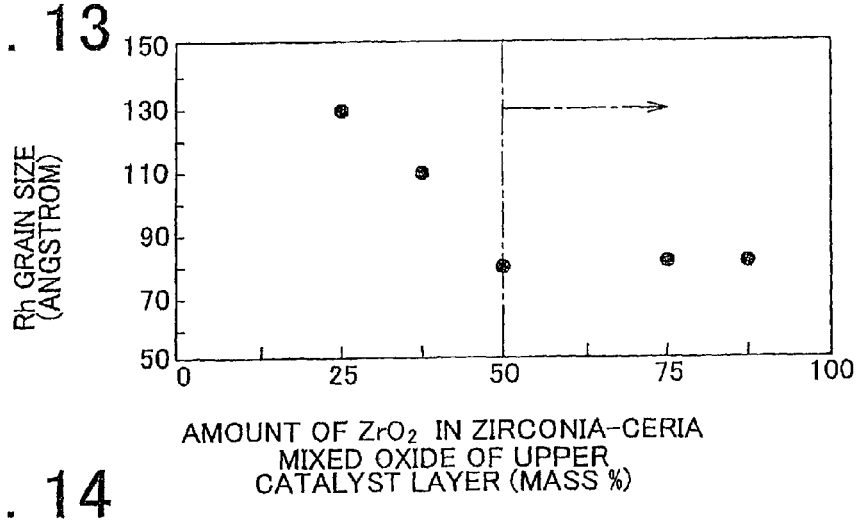
FIG. 13 is a graph showing the relation between the amount of $ZrO_2$ in the ceria-zirconia mixed oxide of an upper catalyst layer and the grain size of Rh.

The grain size of Rh was measured by CO adsorption method for each of the catalysts after the durability tests. The results are shown in the form of the mean grain size in FIG. 13. It is clear from FIG. 13 that it is possible to effectively suppress the grain growth of Rh by using a zirconia-ceria mixed oxide, in which the $ZrO_2$ content is equal to or above 50 mass %, in the upper catalyst layer 3.

Experiment Example 8

The upper catalyst layer 3 was formed on the surface of the lower catalyst layer 2 in a way similar to that of Example 1, except that slurries for the upper layer that were prepared using the zirconia-ceria mixed oxide powders with various $Y_2O_3$ contents. The honeycomb base 1 and the lower catalyst layer 2 were the same as those of Example 1. With regard to the amount of addition of $Y_2O_3$ powder to the zirconia-ceria mixed oxide powder for the upper catalyst layer 3, 6 levels of 0 mass %, 5 mass %, 7 mass %, 10 mass %, 15 mass %, and 25 mass % were set.

Figure 14:
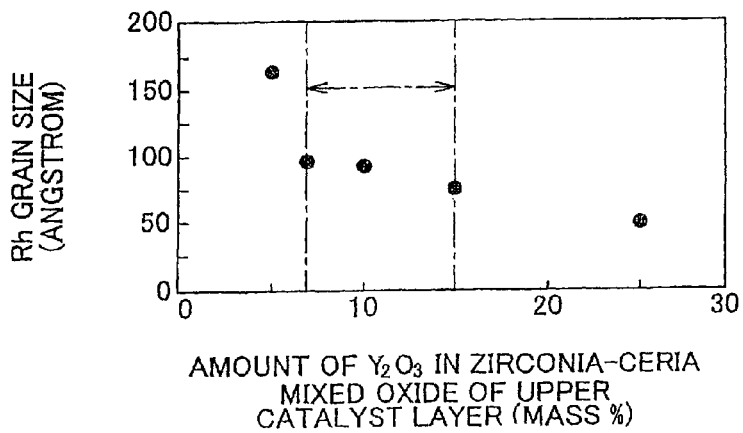
FIG. 14 is a graph showing the relation between the amount of $Y_2O_3$ in the zirconia-ceria mixed oxide of the upper catalyst layer and the grain size of Rh.

Five of the obtained catalysts were subjected to the durability tests similar to those of Experiment Example 1 and the mean grain size of Rh was measured in a way similar to that of Experiment Example 7. The result is shown in FIG. 14. The oxygen occlusion amount was measured in a way similar to that of Experiment Example 1 for each of the catalysts after the durability tests. The result is shown in FIG. 15.

Figure 15:
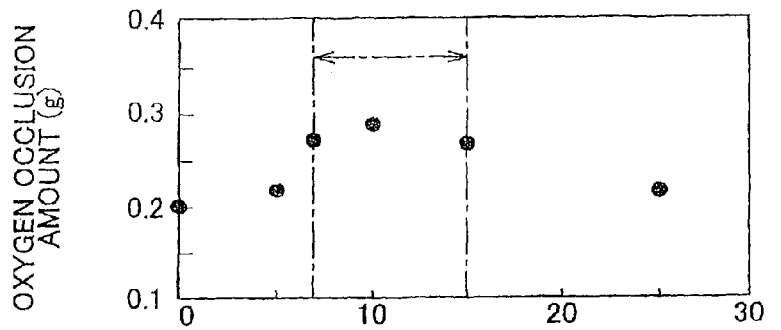
FIG. 15 is a graph showing the relation between the amount of $Y_2O_3$ in the zirconia-ceria mixed oxide of the upper catalyst layer and the amount of oxygen occluded.

It is clear from FIGS. 14 and 15 that when the upper catalyst layer 3 contains $Y_2O_3$, the grain growth of Rh is suppressed and the oxygen occlusion amount increases. In addition, it can also be seen that when the $Y_2O_3$ content in zirconia-ceria mixed oxide for the upper catalyst layer 3 is set within the range of 7 to 15 mass % or more preferably within the range of 7 to 10 mass %, the oxygen occlusion amount is particularly improved.

Experiment Example 9

The upper catalyst layer 3 was formed on the surface of the lower catalyst layer 2 in a way similar to that of Example 1, except that slurries for the upper layer were used that were prepared using the zirconia-ceria mixed oxide powders with various $Nd_2O_3$ contents, The honeycomb base 1 and the lower catalyst layer 2 were the same as those of Example 1. With regard to the amount of addition of $Nd_2O_3$ to the zirconia-ceria mixed oxide, 4 levels of 0 mass %, 0.5 mass %, 12 mass %, and 20 mass % were set.

Figure 16:
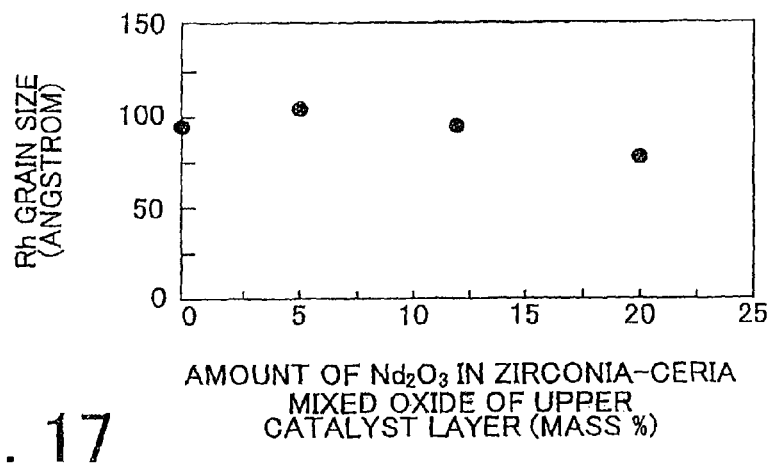
FIG. 16 is a graph showing the relation between the amount of $Nd_2O_3$ in the zirconia-ceria mixed oxide of the upper catalyst layer and the grain size of Rh.

Durability tests similar to those of Experiment Example 1 were conducted for the obtained catalysts and the mean grain size of Rh was measured in a way similar to that of Experiment Example 7. The result is shown in FIG. 16. The oxygen occlusion amount was measured in a way similar to that of Experiment Example 1 for each of the catalysts after the durability tests. The result is shown in FIG. 17.

Figure 17:
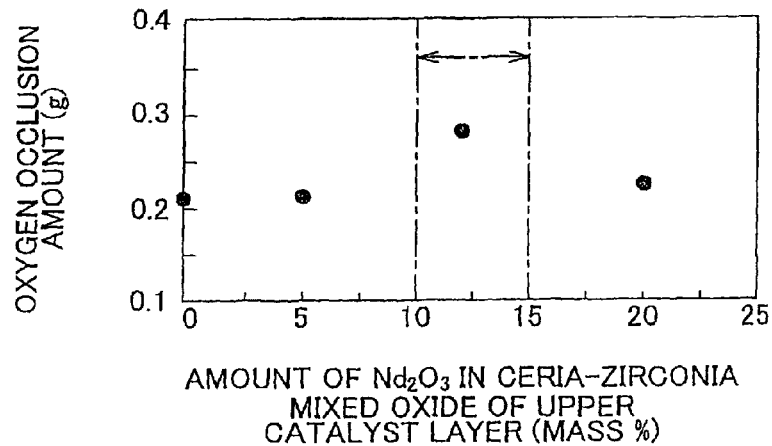
FIG. 17 is a graph showing the relation between the amount of $Nd_2O_3$ in the zirconia-ceria mixed oxide of the upper catalyst layer and the amount of oxygen occluded.

It can be seen from FIGS. 16 and 17 that when the upper catalyst layer 3 contains $Nd_2O_3$, the grain growth of Rh is suppressed and the oxygen occlusion amount is improved. In addition, it can also be seen that when the $Nd_2O_3$ content in the zirconia-ceria mixed oxide of the upper catalyst layer 3 is set within the range of 10 to 15 mass %, the oxygen occlusion amount is particularly improved.

Experiment Example 10

A $Pt/CeO_2$—$ZrO_2$ powder was prepared in a way similar to that of Example 1. The lower catalyst layer 2 was formed on the surface of the honeycomb base 1 with the use of the $Pt/CeO_2$—$ZrO_2$ powder.

After a predetermined amount of rhodium nitrate aqueous solution was impregnated into the zirconia-ceria mixed oxide powder that contained $Nd_2O_3$ at three levels of 5, 12, and 20 mass %, respectively, and also contained 20 mass % of $CeO_2$ and 9 mass % of $Y_2O_3$ and in which the remaining parts were $ZrO_2$, the zirconia-ceria mixed oxide powder was subjected to evaporation to dryness, whereby $Rh/ZrO_2$—$CeO_2$ powders that carried 3 mass % of Rh were prepared. Slurries for the upper layer were prepared by mixing distilled water with 10 parts by mass of $Rh/ZrO_2$—$CeO_2$ powder and 5 parts by mass of alumina sol ($Al_2O_3$: 10 mass %) as a binder, and then the upper catalyst layer 3 was formed on the surface of the lower catalyst layer 2.

Durability tests similar to those of Experiment Example 1 were conducted for the obtained catalysts and the oxygen occlusion amount was measured for each of the catalysts after the durability tests in a way similar to that of Experiment Example 1. The catalysts after the durability tests were installed in an exhaust system of an in-line 4-cylinder 2.4 L engine, the engine was operated at the stoichiometric air-fuel ratio until the temperature of the gas that flowed into the catalyst became 500° C., and the HC reduction rate during this operation was measured to determine the temperature at which 50% of HC was reduced (50% reduction temperature) (T50). The result is shown in FIG. 18.

Figure 18:
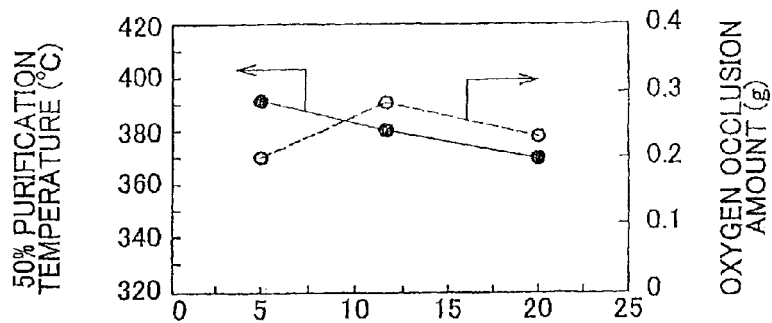
FIG. 18 is a graph showing the relation between the amount of $Nd_2O_3$ in the zirconia-ceria mixed oxide of the upper catalyst layer, and the HC 50% reduction temperature and the amount of oxygen occluded.

It can be seen from FIG. 18 that although the HC 50% reduction temperature decreases as the $Nd_2O_3$ content in the zirconia-ceria mixed oxide of the upper catalyst layer 3 increases, the oxygen occlusion amount has a peak value in relation to the $Nd_2O_3$ content. Thus, it is preferable that the $Nd_2O_3$ content be set within the range of 10 to 15 mass % in view of the tradeoff between these characteristics.

Experiment Example 11

After a predetermined amount of rhodium nitrate aqueous solution was impregnated into the zirconia-ceria mixed oxide powders that contained $CeO_2$ at 5 levels of 5, 10, 20, 25, and 30 mass %, respectively, and also contained 12 mass % of $Nd_2O_3$ and 9 Mass % of $Y_2O_3$ and in which the remaining parts were $ZrO_2$, the zirconia-ceria mixed oxide powders were subjected to evaporation to dryness, whereby $Rh/ZrO_2$—$CeO_2$ powders that carried 0.3 mass % of Rh were prepared. Slurries for the upper layer were prepared by mixing distilled water with 10 parts by mass of $Rh/ZrO_2$—$CeO_2$ powder and 5 parts by mass of alumina sol ($Al_2O_3$: 10 mass %) as a binder, and then the upper catalyst layer 3 was formed on the surface of the lower catalyst layer 2 formed in a way similar to that of Experiment Example 10.

Durability tests similar to those of Experiment Example 1 were conducted for the obtained catalysts and the $H_2S$ discharge was measured in a way similar to that of Experiment Example 1 for each of the catalysts after the durability tests. The result is shown in FIG. 19.

Figure 19:
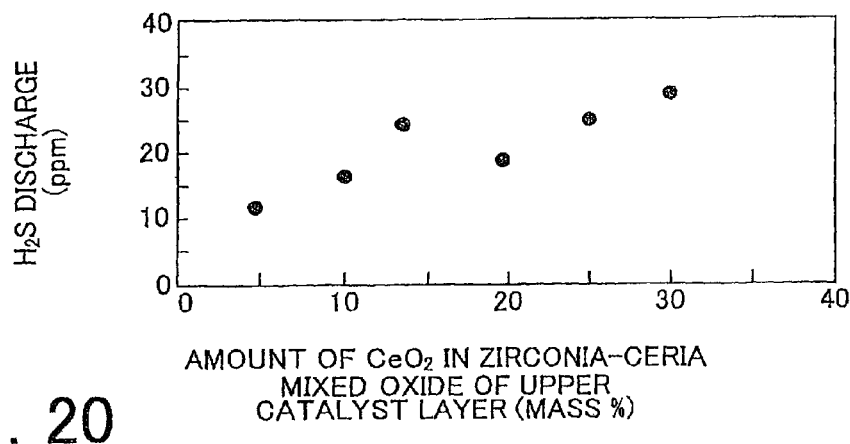
FIG. 19 is a graph showing the relation between the amount of $CeO_2$ in the zirconia-ceria mixed oxide of the upper catalyst layer and the amount of $H_2S$ discharged.

It can be seen from FIG. 19 that the $H_2S$ discharge increases as the $CeO_2$ content in the zirconia-ceria mixed oxide of the upper catalyst layer 3 increases. The upper limit of the $CeO_2$ content is 30 mass % at which the $H_2S$ discharge starts sharply increasing. It has been found that when the amount of $CeO_2$ is less than 10 mass %, the capability of adsorbing and releasing oxygen declines and the effect of moderating fluctuations of the atmosphere thus declines, which results in degradation of purification activity. Thus, it is preferable that the amount of $CeO_2$ in the zirconia-ceria mixed oxide, which is a component of the upper catalyst layer 3, be set within the range of 10 to 30 mass %.

Experiment Example 12

The lower catalyst layer 2 was formed in a way similar to that of Example 1, except that the amount of addition of $La_2O_3$ contained in the ceria-zirconia mixed oxide powder was changed. The honeycomb base 1 and the upper catalyst layer 3 were the same as those of Example 1. With regard to the amount of addition of $La_2O_3$ to the ceria-zirconia mixed oxide of the lower catalyst layer 2, six levels of 0 mass %, 1 mass %, 2 mass %, 3 mass %, 4 mass %, and 6 mass % were set.

Durability tests similar to those of Experiment Example 1 were conducted for the obtained catalysts and the BET specific surface area was measured for each of the catalysts after the durability tests. The result is shown in FIG. 20.

Figure 20:
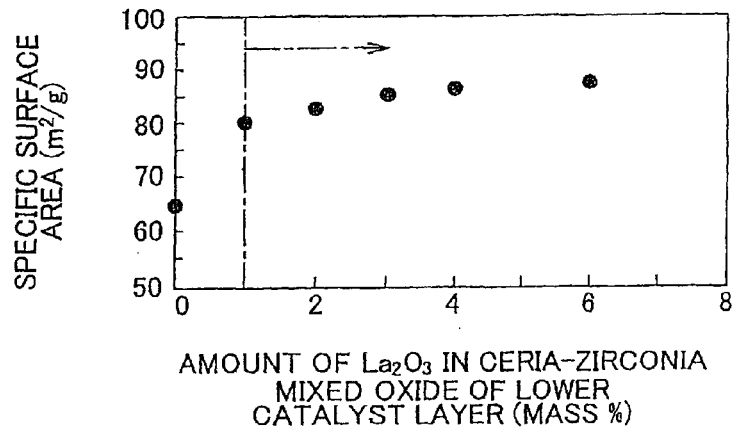
FIG. 20 is a graph showing the relation between the amount of $La_2O_3$ in the ceria-zirconia mixed oxide of the lower catalyst layer and the specific surface area.
Figure 21:
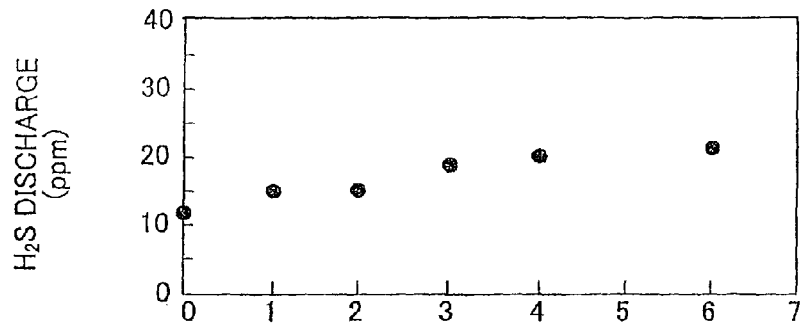
FIG. 21 is a graph showing the relation between the amount of $La_2O_3$ in the ceria-zirconia mixed oxide of the lower catalyst layer and the amount of $H_2S$ discharged.

It is clear from FIG. 20 that when the ceria-zirconia mixed oxide of the lower catalyst layer 2 contains $La_2O_3$, the reduction in the specific surface area during the durability test is suppressed. However, because it has been found that the $H_2S$ discharge increases as shown in FIG. 21 when the $La_2O_3$ content becomes excessive, it is preferable that the $La_2O_3$ content be equal to or below 5 mass % in the ceria-zirconia mixed oxide of the lower catalyst layer 2.

Experiment Example 13

The $Pt/CeO_2$—$ZrO_2$ powders were prepared in a way similar to that of Example 1, except that six varieties of ceria-zirconia mixed oxide powders were used that contained $La_2O_3$ at six levels of 0, 1, 2, 3, 4, and 6 mass %, respectively, and also contained 60 mass % of $CeO_2$ and 7 mass % of $Pr_2O_3$ and in which the remaining parts were $ZrO_2$. After the lower catalyst layer 2 was formed on the surface of the honeycomb base 1, with the use of these $Pt/CeO_2$—$ZrO_2$ powders, the upper catalyst layer 3 was formed in a way similar to that of Experiment Example 5.

Durability tests similar to those of Experiment Example 1 were conducted for the obtained catalysts and the $H_2S$ discharge was measured in a way similar to that of Experiment Example 1 for each of the catalysts after the durability tests. The result is shown in FIG. 21.

It can be seen from FIG. 21 that the $H_2S$ discharge increases as the $La_2O_3$ content in the ceria-zirconia mixed oxide of the lower catalyst layer 2 increases. The $H_2S$ discharge is almost saturated at the point at which the $La_2O_3$ content is 4 mass %. It has been found that when the amount of $La_2O_3$ is less than 1 mass % as shown in FIG. 20, the heat resistance sharply drops. Thus, it is preferable that the amount of $La_2O_3$ in the ceria-zirconia mixed oxide, which is a component of the lower catalyst layer 2, be set within the range of 1 to 5 mass %.

Experiment Example 14

Figure 22:
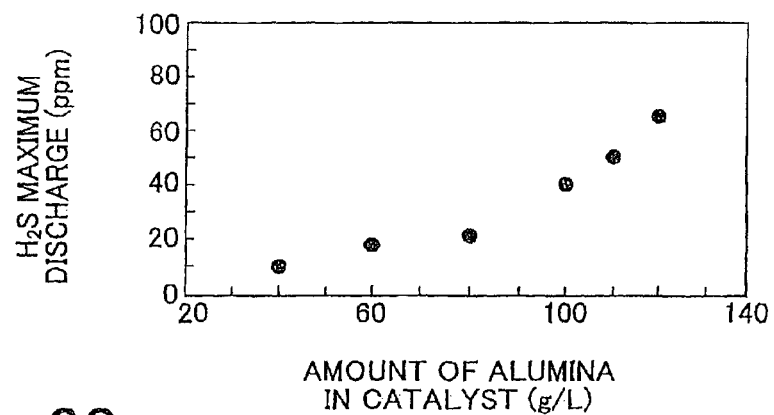
FIG. 22 is a graph showing the relation between the amount of alumina in the catalyst and the maximum amount of $H_2S$ discharged.

The catalyst of Example 1 was prepared, except that six levels of 40, 60, 80, 100, 110, and 120 g/L were set as the total amount of $Al_2O_3$. The tests similar to those of Experiment Example 1 were conducted to determine the $H_2S$ maximum discharge for each of the obtained catalysts. As shown in FIG. 22, the $H_2S$ discharge increases as the amount of $Al_2O_3$ in the catalyst increases. When the amount of $Al_2O_3$ is equal to or below 60 g/L, retention of the catalyst coating layer becomes difficult and detachment occurs. When the total amount of $Al_2O_3$ is set within the range of 60 to 100 g/L, it is possible to achieve both suppression of discharge of $H_2S$ and the structural stability of the catalyst.

Experiment Example 15

Figure 23:
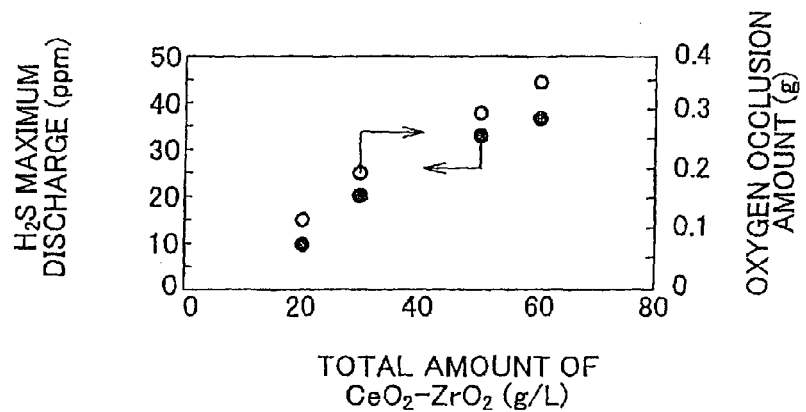
FIG. 23 is a graph showing the relation between the total amount of ceria and zirconia, and the maximum amount of $H_2S$ discharged and the amount of oxygen occluded.

The $H_2S$ maximum discharge and the oxygen occlusion amount were measured in a way similar to that of Experiment Example 1 with the use of the catalysts that were obtained in a way similar to that of Example 1, except that the catalysts were prepared, in which the total amount of $CeO_2$ and $ZrO_2$ contained in the catalysts was 20, 25, 50, and 60 g/L within the range of 20 to 60 g/L. As shown in FIG. 23, there is a tendency that as the total amount of $CeO_2$ and $ZrO_2$ in the catalysts increases, the oxygen occlusion amount increases and at the same time, the amount of $H_2S$ also increases. When the total amount of $CeO_2$ and $ZrO_2$ is set within the range of 25 to 50 g/L, it is possible to both secure the oxygen occlusion amount and suppress the $H_2S$ discharge.

Experiment Example 16

Figure 24:
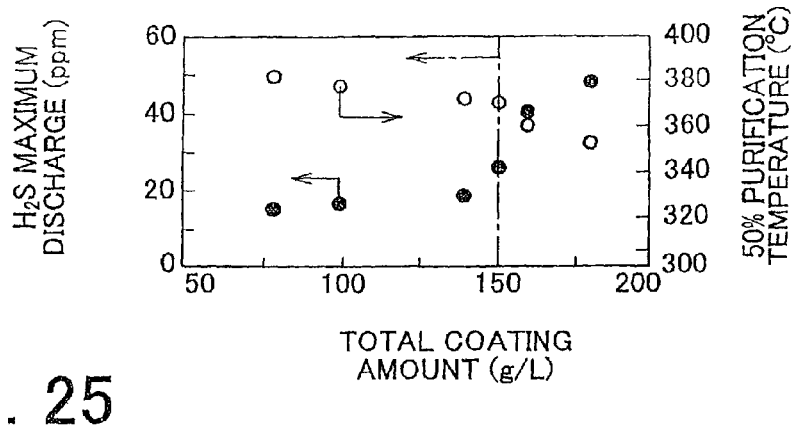
FIG. 24 is a graph showing the relation between the total amount of coating, and the HC 50% reduction temperature and the maximum amount of $H_2S$ discharged.

The exhaust gas purification catalysts, in which the total amount of coating was 80, 100, 140, 150, 160, and 180 g/L, were prepared, where the proportions between the materials were fixed at those of Example 1. The $H_2S$ maximum discharge was measured in a way similar to that of Experiment Example 1 for each of the obtained catalysts to determine the HC 50% reduction temperature in a way similar to that of Experiment Example 11. As shown in FIG. 24, when the total amount of coating increases, the dispersion of noble metal and the frequency of contact with the exhaust gas increase, which improves the performance in reducing HC, while on the other hand, the $H_2S$ discharge increases. When the total amount of coating is set within the range of 100 to 150 g/L, it is possible to both secure the catalytic activity and suppress the $H_2S$ discharge.

Experiment Example 17

Figure 25:
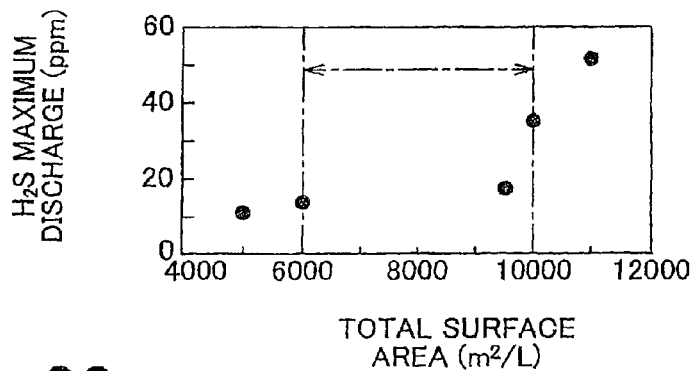
FIG. 25 is a graph showing the relation between the total surface area and the amount of $H_2S$ discharged.

The exhaust gas purification catalysts, in which the total surface area of the catalyst was varied within the range of 5000 to 11000 $m^2$, that is, the total surface areas were 5000, 6000, 9500, 10000, and 11000 $m^2$/L, were prepared by changing the condition under which preliminary burning of the ceria-zirconia mixed oxide used in Example 1 was conducted. The $H_2S$ maximum discharge was measured in a way similar to that of Experiment Example 1 for each of the obtained catalysts. As shown in FIG. 25, there is a tendency that as the total surface, area increases, the $H_2S$ discharge increases. When the total surface area is less than 6000 $m^2$/L, the dispersion of noble metal declines and the catalytic activity can become insufficient. Thus, the total surface area of the catalyst is preferably within the range of 6000 to 10000 $m^2$/L.

Experiment Example 18

The alumina-rich catalyst (Comparative Example 2) was prepared in a way similar to that of Example 1, except that the amount of alumina contained in the upper catalyst layer 3 was set to 45 g per liter of the honeycomb base 1. Note that the catalyst of Example 1 contains, in the upper catalyst layer 3, 25 g of alumina per liter of the honeycomb base 1.

Durability tests similar to those of Experiment Example 1 were conducted for this alumina-rich catalyst of Comparative Example 2 and the $H_2S$ maximum discharge was measured in a way similar to that of Experiment Example 1. The result is shown in FIG. 26 with the result concerning the catalyst of Example 1.

Figure 26:
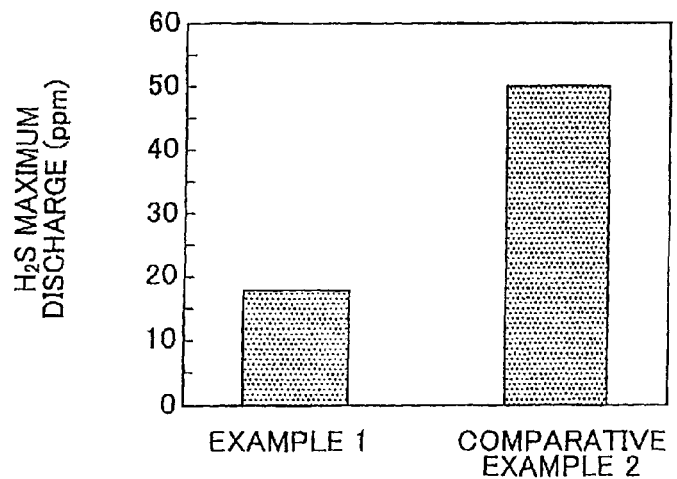
FIG. 26 is a bar graph showing the maximum amount of $H_2S$ discharged.
Figure 27:
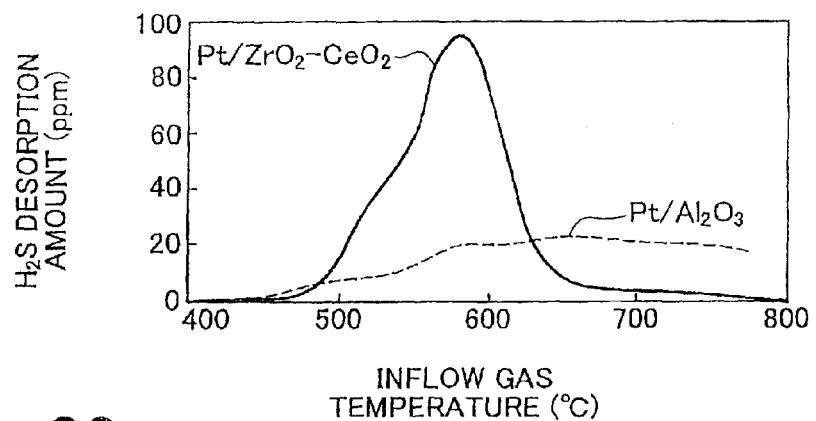
FIG. 27 is a graph showing the relation between the inflow gas temperature and the amount of $H_2S$ desorbed.

It can be seen from FIG. 26 that as the amount of alumina increases, the $H_2S$ discharge increases. FIG. 27 shows the manner in which $H_2S$ is desorbed in the cases of alumina and ceria-zirconia mixed oxide. Most of the sulfur adsorbed by ceria-zirconia mixed oxide is desorbed at or below 600° C. and the amount of desorption of the sulfur adsorbed by alumina is large even in a high temperature region of 600° C. or higher. Thus, when the amount of alumina is large, the $H_2S$ discharge is large even in a high temperature region. Thus, it is preferable that the alumina content be as small as possible and be set within the range of 60 to 100 per liter of the honeycomb base 1 through the entire catalyst.

Experiment Example 19

The amount of $CO_2$ desorbed that is an index of the number of basic sites of the catalyst was determined by temperature programmed desorption (TPD) of $CO_2$ ($CO_2$-TPD method). The honeycomb catalyst of which the diameter, the length, and the volume were 30 mm, 50 mm, and 35 cc, respectively, was used as the sample, this honeycomb catalyst was set in a catalyst evaluation unit, and the measurement was conducted under the condition that the flow rate of the test gas was 5 L/min. First, the lean gas ($O_2$ (4 vol %)+$N_2$ (96 vol %)) and the rich gas ($H_2$ (4 vol %)+$N_2$ (96 vol %)) were passed through the honeycomb catalyst alternately while switching between the lean gas and the rich gas was performed every 60 seconds. During this, the temperature was increased from the initial temperature of 90° C. to 810° C. at a temperature increase speed of 40° C./min. After the inflow gas temperature became 810° C., the inflow gas temperature was kept at 810° C. and the lean gas and the rich gas were passed through the honeycomb catalyst for 10 minutes while switching between the lean gas and the rich gas was performed such that a 10-second flow of the lean gas and a 20-second flow of the rich gas were alternately conducted. Then, $N_2$ gas at 90° C. was passed through the honeycomb catalyst for 30 minutes (pretreatment).

Next, the gas, $CO_2$ (0.5 vol %)+$N_2$ (99.5 vol %), was passed through the honeycomb catalyst for 10 minutes, where the inflow gas temperature is 90° C., thereby having $CO_2$ adsorbed by the sample ($CO_2$ adsorption treatment). $N_2$ gas at 90° C. was passed through the sample, by which $CO_2$ had been adsorbed, for 15 minutes and then $N_2$ gas was passed through the sample while the temperature was increased to 810° C. at a speed of 40° C./min, thereby having $CO_2$ desorbed ($CO_2$ desorption treatment).

During the $CO_2$ desorption treatment, the amount of $CO_2$ in the gas discharged from when the increase of temperature was started to when the temperature reached 810° C., was measured. An engine exhaust gas analyzer "MEXA-4300FT" made by HORIBA, Ltd. was used to measure the concentration of $CO_2$. The amount of $CO_2$ desorbed from the catalyst sample was converted into the amount per liter of the catalyst and the number of basic sites of the catalyst was computed.

Because in the above measurement conditions, there was the background concentration of 20 to 30 ppm when the $CO_2$ desorption treatment test was conducted, it is conceivable that the data includes systematic errors. Thus, in computing the number of basic sites of the catalyst, a method was used in which the background concentration of $CO_2$ at the time of starting increasing the temperature for the $CO_2$ desorption treatment and the background concentration of $CO_2$ at the time of the end of the $CO_2$ desorption treatment were connected by a straight line and the areas of the peaks of desorption that were observed as the concentration equal to or above the background concentration were integrated. The amount of desorption of $CO_2$ (mmol/L-cat) is regarded as the number of basic sites of the catalyst.

The number of basic sites of the catalyst of Example 1 and the numbers of basic sites of the two kinds of the commercially available catalysts described below were measured by the above-described method. The catalyst of Example 1 is excellent in the capability of adsorbing and releasing oxygen and is low in the amount of $H_2S$ produced. The commercially available catalyst 1 is excellent in the capability of adsorbing and releasing oxygen and causes a large amount of $H_2S$ to be formed. The commercially available catalyst 2 is insufficient in the capability of adsorbing and releasing oxygen and causes a small amount of $H_2S$ to be formed.

The samples shaped as described above were cut out of these three catalysts and the number of basic sites was measured for each of the samples. As a result, the numbers of basic sites of the catalyst of Example 1, the commercially available catalyst 1, and the commercially available catalyst 2 were 5.3, 6.4, and 3.6 mmol/L-cat. Thus, it is inferred that when the number of basic sites is set within the range of 4 to 6 mmol/L-cat, it becomes possible to both obtain the required capability of adsorbing oxygen and reduce the amount of $H_2S$ formed.

Experiment Example 20

Figure 28:
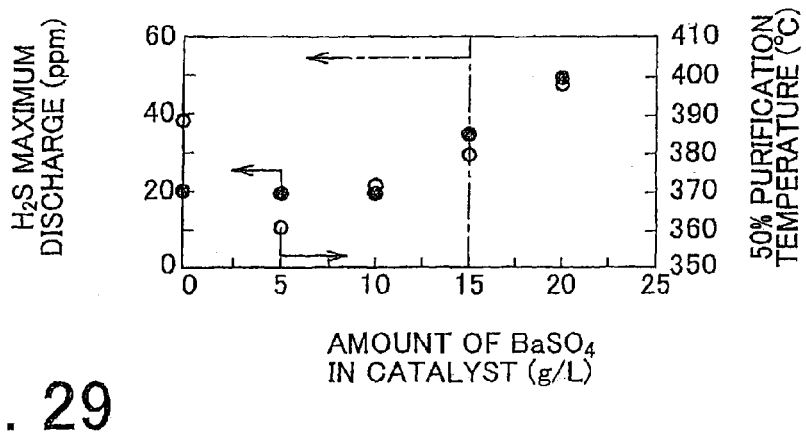
FIG. 28 is a graph showing the relation between the amount of $BaSO_4$, and the maximum amount of $H_2S$ discharged and the HC 50% reduction temperature.

The catalyst of Example 1 was prepared, except that five levels of 0, 5, 10, 15, and 20 g/L were set within the range of 0 to 20 g/L as the amount of addition of $BaSO_4$ powder to the lower catalyst layer. The $H_2S$ maximum discharge was measured in a way similar to that of Experiment Example 1 for each of the obtained catalysts. While the engine was operated at the stoichiometric air-fuel ratio until the temperature of the gas that flowed into the catalyst became 500° C., the HC reduction rate during this operation was measured to determine the HC 50% reduction temperature. As shown in FIG. 28, because the HC 50% reduction temperature is low and the $H_2S$ discharge is also low when the amount of $BaSO_4$ is within the range of 5 to 15 g/L, it is preferable that the amount of $BaSO_4$ added be equal to or below 15 g/L.

Experiment Example 21

The catalyst described as Example 4 of JP-A-2007-090254 was prepared and used as the catalyst of Comparative Example 3. The ceria particles that carried Pt and the active alumina particles that carried Pt were mixed in the mass ratio of 1:1 and were added with alumina sol and water to prepare a slurry, which was used to form 195 g/L of the lower catalyst layer. Then, zirconia particles that carried Rh were prepared by a method described in JP-A-2007-090254, the zirconia particles that carried Rh and ceria particles were mixed in the mass ratio of 10:1 and were added with alumina sol and water to prepare a slurry, which was used to form 75 g/L of the upper catalyst layer.

Figure 29:
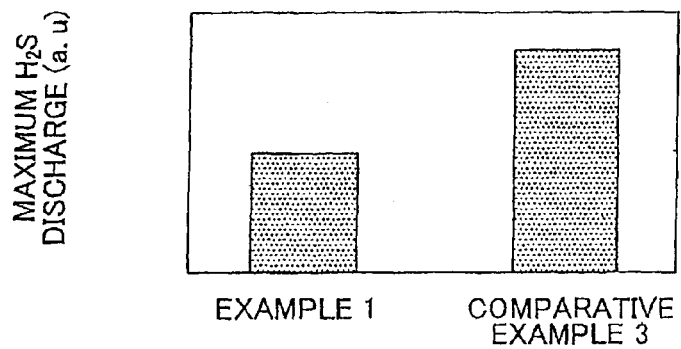
FIG. 29 is a bar graph showing the maximum amount of $H_2S$ discharged.
Figure 30:
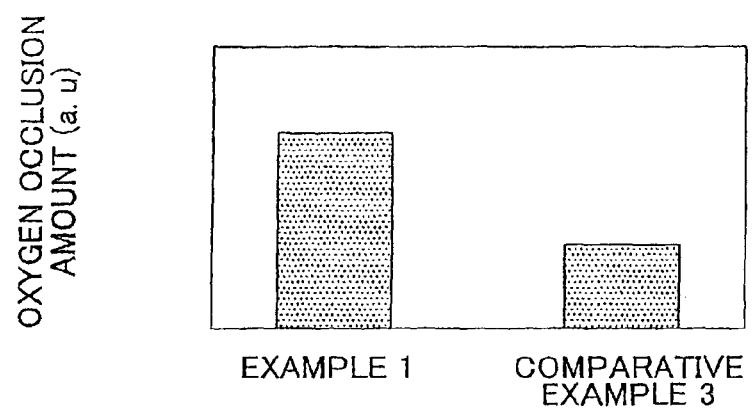
FIG. 30 is a bar graph showing the amount of oxygen occluded.

With regard to the catalyst of Comparative Example 3, the amount of ceria is 7.5 g/L in the upper catalyst layer and 97.5 g/L in the lower catalyst layer, that is, the amount of ceria is plenty, so that the capacity of storing oxygen is high when the catalyst is fresh. As shown in FIG. 29, however, there is a problem that the amount of $H_2S$ formed is large. The capacity of storing oxygen was measured after a durability test as in the case of the above-described Experiment Example 1. As a result, it has been found that because no zirconia is contained, the grain growth of ceria particles is significant and the rate of reduction in the oxygen occlusion amount is significant as shown in FIG. 30.

Experiment Example 22

The catalyst described as Example 1 in JP-A-2004-298813 was prepared and used as the catalyst of Comparative Example 4. Specifically, a slurry, in which alumina that carried Pt, a ceria-zirconia mixed oxide in which the mass ratio between ceria and zirconia was 1:1, and boehmite were mixed in the mass ratio of 6:3:1, was used to form the lower catalyst layer. Then, a slurry, in which less-thermally-deteriorative ceria-zirconia mixed oxide that carried Rh, with the mass ratio between ceria and zirconia of 3:7, active alumina, and boehmite were mixed, was used to form the upper catalyst layer. Because there is no disclosure concerning the amount of coating in the description of Example 1 in JP-A-2004-298813, the amount of coating was set so that the amount of ceria was 30 g/L that is the upper limit of the amount of ceria of the present invention, and the mass ratio between the lower catalyst layer and the upper catalyst layer was 2:1.

Figure 31:
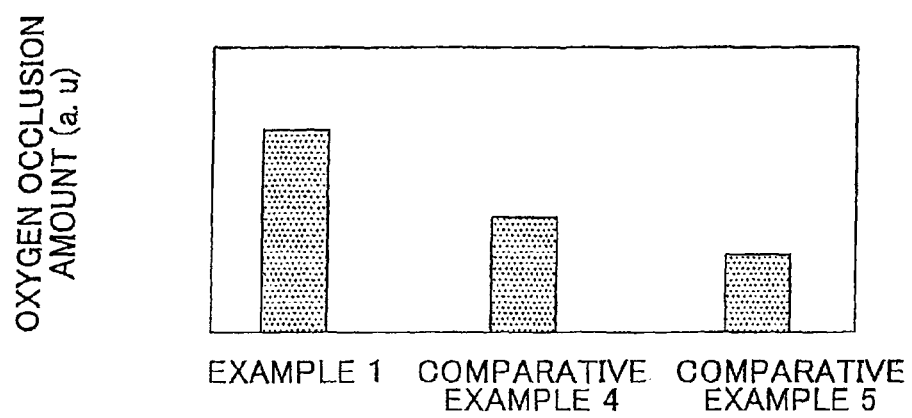
FIG. 31 is a bar graph showing the amount of oxygen occluded.

The catalyst of Comparative Example 4 was subjected to the measurement of the capacity of storing oxygen after the durability test as in the case of the above-described Experiment Example 1. As a result, it has been found that because no additive was contained, the grain growth of ceria-zirconia mixed oxide was significant and the required capacity of storing oxygen could not be obtained as shown in FIG. 31.

Experiment Example 23

The downstream-side three-way catalyst described as Example 2 in JP-A-2007-111650 was prepared and used as the catalyst of Comparative Example 5. Specifically, a ceria-zirconia mixed oxide (mass ratio was 1:1) was prepared by drying a mixed aqueous solution in which cerium nitrate and zirconium nitrate were dissolved, and after having Pt carried by the lower catalyst layer that contained 40 g/L of this ceria-zirconia mixed oxide and 90 g/L of θ-alumina, the upper catalyst layer was formed of θ-alumina that carried Rh. The amount of noble metal carried, etc. were set similarly to the above-described Example 1.

The catalyst of Comparative Example 5 was subjected to the measurement of the capability of storing oxygen after the durability test as in the case of the above-described Experiment Example 1. As a result, it has been found that because the mixing degree of the ceria-zirconia mixed oxide was insufficient and the ceria-zirconia mixed oxide contained no additive, the grain growth of ceria-zirconia mixed oxide was significant and the required capacity of storing oxygen could not be obtained as shown in FIG. 31.

As described above, the catalyst described in JP-A-2007-090254 cannot sufficiently suppress formation of $H_2S$, and the required capacity of storing oxygen cannot be obtained with the use of either of the catalysts described in JP-A-2004-298813 and JP-A-2007-111650. As a result of investigating various kinds of oxides contained in the catalyst, the invention has realized the catalyst that has the necessary and sufficient capacity of storing oxygen even when the total amount of ceria is small, that is, within the range of 10 to 30 g/L, and with which it is possible to suppress the amount of formation of $H_2S$.

The exhaust gas purification catalyst of the invention can be used as a three-way catalyst and can also be used as the so-called startup catalyst immediately downstream of the engine. Moreover, when the exhaust gas purification catalyst of the invention is used as the downstream-side catalyst in a system in which two or more catalysts, including the startup catalyst and the underfloor catalyst, are combined or in a tandem catalyst system in which two or more catalysts are arranged in series, it is possible to both improve the oxygen-adsorbing/releasing capability of ceria and suppress the formation of $H_2S$. Thus, it becomes possible to construct a system that, even after a severe durability test, sufficiently reduces NOx etc., formed under unstable atmosphere, that could not be reduced by the upstream-side catalyst.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. An exhaust gas purification catalyst comprising:
a carrier base;
a lower catalyst layer, formed on a surface of the carrier base, including:
a lower layer carrier that contains a ceria-zirconia mixed oxide having 50 to 70 mass % of $CeO_2$ and 5 mass % or more of $Pr_2O_3$; and
at least one of Pt and Pd, which is carried by the lower layer carrier; and
an upper catalyst layer, formed on a surface of the lower catalyst layer, including:
an upper layer carrier that contains oxides including at least zirconia; and
at least Rh that is carried by the upper catalyst layer,
wherein the upper layer carrier contains a zirconia-cera mixed oxide containing 7 to 15 mass % of $Y_2O_3$, in which a $ZrO_2$ content is equal to or higher than 50 mass %,
wherein a total amount of $CeO_2$ in the exhaust gas purification catalyst is 15 to 30 g per liter of the carrier base.

2. The exhaust gas purification catalyst according to claim 1, wherein the zirconia-ceria mixed oxide contains 10 to 15 mass % of $Nd_2O_3$.

3. The exhaust gas purification catalyst according to claim 1, wherein the zirconia-ceria mixed oxide contains 10 to 30 mass % of $CeO_2$.

4. The exhaust gas purification catalyst according to claim 1, wherein 80% or more of entire Rh is carried by the zirconia-ceria mixed oxide of the upper catalyst layer.

5. The exhaust gas purification catalyst according to claim 1, wherein the ceria-zirconia mixed oxide further contains 1 mass % or more of $La_2O_3$.

6. The exhaust gas purification catalyst according to claim 1, further comprising alumina, wherein a total amount of the alumina is equal to or less than 100 g per liter of the carrier base.

7. The exhaust gas purification catalyst according to claim 1, wherein a total amount of ceria and zirconia contained in the exhaust gas purification catalyst is 30 to 50 g per liter of the carrier base.

8. The exhaust gas purification catalyst according to claim 1, wherein a total amount of the upper catalyst layer and the lower catalyst layer is equal to or less than 150 g per liter of the carrier base.

9. The exhaust gas purification catalyst according to claim 1, wherein a total surface area of the exhaust gas purification catalyst is within a range of 6000 to 10000 $m^2/L$.

10. The exhaust gas purification catalyst according to claim 1, wherein 80% or more of entire Pt is carried by the ceria-zirconia mixed oxide of the tower catalyst layer.

11. The exhaust gas purification catalyst according to claim 1, wherein the lower layer carrier and the upper layer carrier contain active alumina that contains 2 to 6 mass % of $La_2O_3$.

12. The exhaust gas purification catalyst according to claim 1, wherein the exhaust gas purification catalyst further contains 15 g or less of $BaSO_4$ per liter of the carrier base.

* * * * *